3,425,972
PREPARATION OF WATER SOLUBLE TRANSPARENT FILMS FROM DEXTRIN AND POLYVINYL ALCOHOL
Luciano Nobile and Carlo Alberto Tesei, Milan, Italy, assignors to Ledoga S.p.A., Milan, Italy
Continuation-in-part of application Ser. No. 375,294, June 15, 1964. This application Apr. 27, 1967, Ser. No. 634,278
Claims priority, application Italy, June 20, 1963, 12,749/63
U.S. Cl. 260—17.4          4 Claims
Int. Cl. C08f 29/30; B29d 7/02

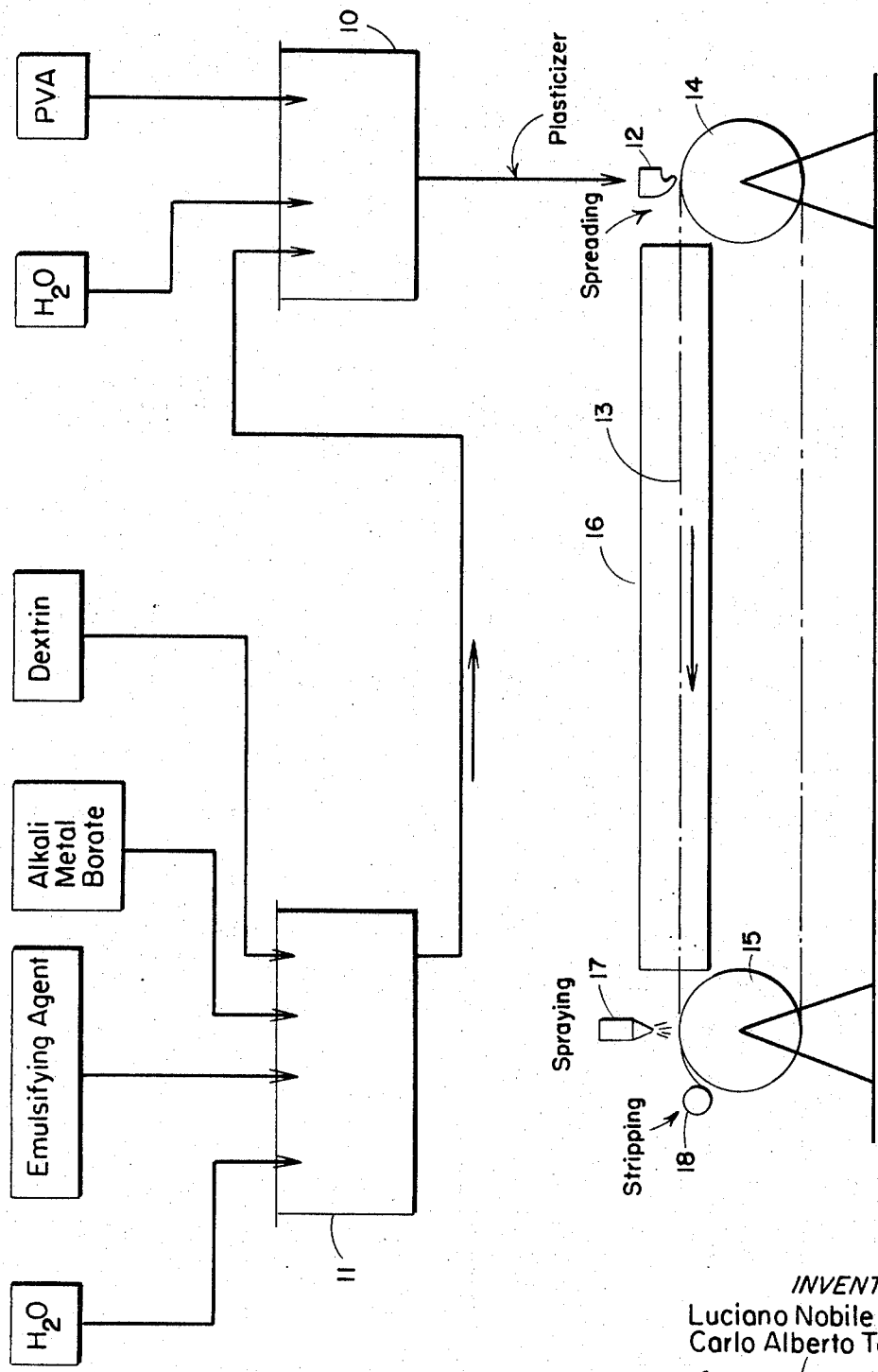

ABSTRACT OF THE DISCLOSURE

Self-supporting transparent water-soluble films composed essentially of white dextrin, polyvinyl alcohol, an emulsifying agent and an alkali metal borate are prepared by heating a suspension of the emulsifying agent, the alkali metal borate and the white dextrin, then adding an aqueous solution of polyvinyl alcohol containing a plasticizing polyalcohol.

---

The present application is a continuation-in-part of our co-pending application Ser. No. 375,294 filed June 15, 1964, now abandoned. It refers to the preparation of water soluble transparent dextrin and polyvinyl alcohol films for use in packing pre-weighed products or for other special industrial and hygienic uses in laundries and various communities.

It is known that polyvinyl alcohol films possess the property of being water-soluble at various temperatures, according to the degree of hydrolysis and viscosity of the product used. It is also known that both white and yellow dextrins give water soluble films which, however, do not possess sufficient mechanical resistance, are not clear and are therefore only used for covering paper or fabrics.

It is also known that some types of yellow dextrins are compatible in certain proportions with some types of polyvinyl alcohols provided the concentration of total solids is kept below 15%. However, the resulting films are not very resistant (if dextrin is used in large quantities) because the degradation of the starch from which the dextrin is obtained is too excessive, and moreover, the latter is yellow. White dextrins are also compatible with polyvinyl alcohol but this likewise is limited to low concentrations of the former in the mixtures.

We have found a process for combining large quantities of white dextrin with small quantities of various types of polyvinyl alcohol in the presence of traces of a substance selected from alkali metal borates, such as for instance sodium tetraborate, which possess the surprising property of improving the compatibility between polyvinyl alcohol and dextrins, giving rise to colored, transparent mechanically resistant and water-soluble films such as those produced by polyvinyl alcohol alone. These combinations occur also in solutions exceeding 20% concentration and containing up to 40% of total solids (dextrin + polyvinyl alcohol).

The main advantage afforded by the use of these mixtures instead of those of polyvinyl alcohol alone essentially consists in the substantial reduction of the cost price per kg. of film which permits cost reductions of the raw materials even exceeding 50%. Moreover, it is similarly possible to obtain water-soluble films combining the dextrin with different quantities of polyvinyl alcohol of various acetyl number and molecular weight. This gives rise to products completely similar, in their mechanical and chemical properties, to normal commercial films prepared with polyvinyl alcohol alone.

The uses of the films prepared by us from white dextrin and polyvinyl alcohol films, that is, packaging of pre-weighed products such as detergents, salts and bath salts; wrapping of dirty and infected linen in hospitals or various communities in order to permit as little handling as possible of same, and thereby minimize the spread of harmful bacteria. The films of the present invention can also be employed in combination with other films, such as polyethylene, polyvinyl chloride, etc. because of the great resistance offered by our product to the passage of air and gases; as a mould-lining and parting agent in manufacturing articles of polyester resins and eventually, whenever polyvinyl alcohol is approved by the food and drug authorities, also for the packing of pre-weighed alimentary products which can be cooked within the container bag.

The materials used in the preparation of the films described herein are white dextrins, polyvinyl alcohols, substances gelling polyvinyl alcohol, plasticizers and non-adhesive coatings. The white dextrins used by us are those derived from the degradation process of corn, wheat, potato, tapioca and sago starch, with a solubility in water equal to or less than 90% by weight.

Polyvinyl alcohols are derived from the hydrolysis of polyvinyl acetate at various degrees of polymerization. The factors governing the production of the various types of polyvinyl alcohols are the degree of hydrolysis of the acetate and the molecular weight of the starting polyvinyl acetate. Substances soluble in water are thus obtained, their 4% aqueous solutions having a viscosity varying from approximately 5 to 60 cps.; the percentage of non-hydrolysed polyvinyl acetate may vary from 0% to 15% in such solutions. The dextrins are dissolved in water with the aid of traces of emulsifiers and solutions up to approximately 70% may be obtained in this manner. Small quantities (0.5–5%) of an alkali metal borate, such as sodium tetraborate, are dissolved in the dextrin solution. These agents serves, in the subsequent mixing of the dextrin solutions with the polyvinyl alcohol solutions, to increase the compatibility of the two substances obtaining, at the end, a clear and transparent film in the dried condition. The polyvinyl alcohol is dissolved separately, and in order to obtain good solutions, more than 20% of solids should be avoided. The two solutions are then mixed together to obtain a concentration of total solids even exceeding 40%. It is possible to combine up to ⅔ of dextrin with ⅓ of polyvinyl alcohols with respect to the total solids. Of course, it is possible to combine even lower proportions of dextrin with the polyvinyl alcohols but, with this, the economic advantage of the process here described would be decreased. The temperature of solution of the dextrins is 80–90° C. and the time necessary for the operation is 2–3 hours. The temperature of solution of the polyvinyl alcohols is 90–95° C. and the time necessary for the operation is 2–3 hours. The temperature of combination of the two solutions is 80–90° C. and the time necessary for the combination is 2–3 hours.

Plasticizers are added to the already mixed solutions at the combination temperature, in the proportions of 10 to 50 parts with respect to the total solids of the system. Polyalcohols, among which mainly glycerol, sorbitol, xylitol, glycols and ethylene and propylene polyglycols, are used as plasticizers to impart greater elasticity to the films. Finally, the resulting paste, after being kept for the combination time of the above-mentioned temperature, is spread on the belt of a continuous spreader and the damp film introduced into an oven for drying. On removal from the oven, the film is conveniently sprayed with solutions in organic solvents containing 0.5–1% of a fatty substance selected from oils or vegetable or animal fats or derivatives thereof. This operation is necessary to prevent that the film from becoming sticky and tacky during the following winding operation, as it is as a rule very hygroscopic. The process for the preparation of our films comprises:

(a) Heating to 80–90° C. for 2–3 hours a suspension of white dextrin in an aqueous solution of an emulsifying agent and of an agent selected from the group consisting of alkali metal borates, until the dextrin dissolves in the aqueous solution, the proportion of the emulsifying agent and the borate being in the order of 1 to 5% and 0.5 to 5% by weight, respectively, of the sum of weights of dextrin and polyvinyl alcohol in the final dry product, and the proportion of dextrin used being such that its concentration in the solution is 10% to 70% by weight;

(b) Separately heating to 90–95° C. for 2–3 hours a mixture of polyvinyl alcohol and water to form an aqueous solution of polyvinyl alcohol of 10–20% concentration by weight;

(c) Mixing the dextrin and polyvinyl alcohol solutions in such proportion that the concentration of dextrin in the mixed solution is up to twice that of polyvinyl alcohol, mixing the combined solutions with a polyhydric alcohol or a polyglycol in the proportion of 10 to 50% of the total weight of dextrin and polyvinyl alcohol in the combined solutions at a temperature of 80 to 90° C. for 2–3 hours.

The following examples are given for the purpose of illustration.

Example 1

One gram of sodium tetraborate and 4 g. of sucrose monopalmitate are dissolved in 200 ml. of water. The solution is then heated to 85° C. and 88 g. of white potato dextrin are added. Heating is continued for 2 hours keeping the temperature at 85° C. Separately 44 g. of totally hydrolyzed polyvinyl alcohol, of 60 cps. viscosity (4% aqueous solution), are dissolved in 400 ml. of water, adding the polyvinyl alcohol in small proportions and stirring thoroughly. The temperature is kept at 90° C. for 2 hours. The white dextrin solution obtained according to the above method is poured with stirring into this solution and 26 g. of distilled glycerol (20% of the combined weight of the dextrin+polyvinyl alcohol solids) are added. In this stage the temperature is kept at 80° C. for 3 hours. The resulting paste is poured into a film-forming device placed on top of a sheet of glass, which is then placed in an oven for 45 minutes at a temperature of 80° C. A strip of film is obtained which, while still hot, is sprayed with a 1% alcoholic solution of glycerol monostearate. The sample submitted to physico-mechanical tests gives fully satisfactory results when compared with a commercial film constituted solely of polyvinyl alcohol. Transmittance, checked in a Beckman apparatus, is more than doubled.

| | Film prepared according to this application | Commercial film |
|---|---|---|
| Thickness, mm | 0.04 | 0.04 |
| Specific resistance, kg./mm.² | 1.94 | 1.76 |
| Percent elongation | 373 | 255 |
| Bursting tests: | | |
|   Kg./mm.² | 1.4 | 1.2 |
|   Height, mm | 28 | 25 |
| Grams/sq. meter | 40 | 45 |
| Dissolves in water (minimum temperature), ° C | 45 | 50 |
| Permeability to water vapor g. in 24 hours | 6.22 | 6.98 |
| Transmittance at the Beckman apparatus, percent | 80 | 30 |
| Heat sealing | Good | Good |
| Permeability to $O_2$ [1] | 1 | 1 |
| Permeability to $H_2S$ | 1 | 1 |

[1] The permeability values have been expressed in ml./sq. m. 24 h. atm. mil.

Example 2

A solution of white corn dextrin is prepared using 0.5% sodium borate and 2% of oxyethylenated sucroglyceride calculated on the total solids (dextrin+polyvinyl alcohol) as the emulsifier. The term "oxyethylenated sucroglyceride" means a mixture of ethylene oxide condensation complexes with mono- and di-glycerides and sugar esters, prepared according to U.S. Patent 3,277,080. This solution is then added, when complete under the above conditions, to an already prepared warm solution of totally hydrolyzed polyvinyl alcohol of 60 cps. viscosity. Twenty percent by weight of glycerol, calculated on the solids as in Example 1, are then added, and the mixture allowed to react at 85° C. for 3 hours. The paste is then poured, to obtain a film which dried and sprayed as above gives physico-mechanical results similar to those of Example 1. The solubility in warm $H_2$ rises to 0° C; the film is not soluble below 70° C. and is very transparent.

Example 3

A 70% solution of white potato dextrin is prepared using 2% sodium tetraborate and traces of emulsifier. When the preparation has been completed under the already mentioned conditions, this solution is added to a heated and already prepared 20% solution of totally hydrolysed polyvinyl alcohol, of 30 cps. viscosity. The plasticizer is then added in the ratio of 25 parts of E 300 Dow polyethylene glycol, of average molecular weight 300, per 100 parts of dextrin+polyvinyl alcohol solids, and the mass, heated to the already indicated temperatures, such as 80° C. for 2 hours, gives a film which sprayed with soluble mixed tallow sucroglyceride in alcoholic solution, while in the dry state, gives a transparent film (75% transmittance with the Beckman) which does not become tacky even at 80% relative humidity. The resistance is raised to 2.7 kg. mm.² and the stretching falls from 373 to 170%. The solids represents 44% of the final solution (considering also the plasticizer) and the ratio between white dextrin and polyvinyl alcohol is 2:3 to 1:3.

Example 4

Sodium tetraborate (2.1 kg.), 4 kg. of oxyethylenated tallow sucroglyceride and 220 kg. of white potato dextrin are dissolved in 500 litres of water. The temperature is raised to 80° C. and 1,000 litres of 10% polyvinyl alcohol solution are heated separately to 90° C. for 3 hours. The resulting solution is treated with the previoulsy prepared dextrin solution and 65 kg. of glycerol are added. After 3 hours at 80° C., the paste is spread on the spreader belt. The dried film is removed from the support and, while still hot, sprayed with an 0.5% solution of tallow sucroglyceride in methanol and then wound on a reel.

Example 5

The present example concerns the preparation of films soluble at 30° C. It is sufficient for this purpose to use polyvinyl alcohol solutions containing 10–11% of non-hydrolysed polyvinyl acetate and with a viscosity of approximately 10 cps. For instance, 10% solutions of this last polyvinyl alcohol can be used with 30% white potato dextrin solutions, sodium tetraborate as binder between the two, and 25 percent of glycerol as plasticizer based on the combined weight of dextrin+polyvinyl alcohol. The resulting paste is spread on the spreader belt and dried at a temperature of 65° C. with forced ventilation. The film is soluble in water at 30° C. and can be used, for instance, for packaging of those detergents which must be used in the cold. The total solids represent 21% and the proportion between dextrin and polyvinyl alcohol is from 2:3 to 1:3.

Example 6

This example illustrates the use of a plasticizer differing from glycerol. Two hundreds milliliters of a 44% solution of white grain dextrin admixed with 1 g. of sodium tetraborate and an emulsifier, is mixed with an already prepared 10% solution of high viscosity and totally hydrolysed polyvinyl alcohol. Forty percent of sorbitol, calculated on the combined weight of dextrin and polyvinyl alcohol, are added to the mass. The resulting film has the following properties:

| | |
|---|---|
| Thickness | 0.04 |
| Percent elongation | 230 |
| Specific resistance, kg./mm.$^2$ | 2.0 |
| Bursting tests: | |
| Kg./mm.$^2$ | 1.3 |
| Height in mm. | 17 |

Example 7

An amount of 440 ml. of water, 5.9 g. of oxyethylenated tallow sucroglyceride, 1.5 g. of sodium borate and 193 g. of mais dextrin are heated to the temperature of 85° C. Independently, 96.5 g. of strongly hydrolysed polyvinyl alcohol are dissolved in 880 ml. of water and the solution is heated at 95° C. for 3 hours. After this period the first mixture is added to the solution of polyvinyl alcohol and after further addition of 58 g. of glycerol (20% of the combined weight of dextrin and polyvinyl alcohol) and traces of sodium pentachlorophenate as preservative, the temperature is lowered to 90° C. and the reaction is continued for 3 hours. The film obtained from this paste is, after drying, very bright and transparent and its physical and mechanical characteristics are comparable with those of the films prepared according to the preceding examples.

Example 8

In 290 ml. of hot water there are dissolved 1.77 g. of Na$_2$B$_4$O$_7$, 4.5 g. of oxyethylenated coconut sucroglyceride and 127 g. of dextrin. Separately, a solution of 10% polyvinyl alcohol in water is prepared at 90° C. To this solution the above described mixture is added with stirring, followed by 22.5 g. of glycerol and some antifermentative compound. The reaction is continued for three hours at 90° C. The film obtained from this paste possesses good elongation.

The procedure for carrying out our invention is illustrated diagrammatically on the accompanying drawing wherein there is shown at 10 a vessel in which the polyvinyl alcohol is dissolved in water under heat. In a separate vessel 11 the dextrin is dissolved in water under heat together with the emulsifying and gelling agents. The mixture is then poured into vessel 10, after being allowed to react therein for the time and at the temperature hereinabove disclosed, the resulting pasty mass is delivered to a spreading device 12 of known construction which distributes the paste uniformly on a belt 13 which passes over an idler drum 13 and a driven drum 14. The belt passes through a drying oven 16, and upon emerging therefrom the dried film is sprayed at 17 with the nontacky coating film, and finally is stripped off the belt and wound on a roll, as indicated at 18.

We claim:
1. In a process for the manufacture of self-supporting water-soluble transparent films by spreading a plastic composition containing water on a casting surface followed by drying and stripping, the improvement comprising using a plastic composition prepared by the steps comprising:
(a) heating to 80–90° C. for 2–3 hours a suspension of white dextrin in an aqueous solution of an emulsifying agent and of an agent selected from the group consisting of alkali metal borates, until the dextrin dissolves in the aqueous solution, the proportion of the emulsifying agent and alkali metal borate being of the order of 1 to 5% and 0.5 to 5% by weight, respectively, of the sum of the weights of dextrin and polyvinyl alcohol in the final dry product, and the proportion of dextrin used being such that its concentration in the solution is 10% to 70% by weight;
(b) separately heating to 90–95° C. for 2–3 hours a mixture of polyvinyl alcohol and water to form an aqueous solution of polyvinyl alcohol of 10–20% concentration by weight;
(c) mixing the dextrin and polyvinyl alcohol solutions in such proportion that the concentration of dextrin in the mixed solution is up to twice that of the polyvinyl alcohol; and
(d) mixing with the combined solutions a member of the group consisting of polyhydric alcohol and polyglycol plasticizers in the proportion of 10 to 50% of the total weight of dextrin and polyvinyl alcohol in the combined solutions at a temperature of 80 to 90° C. for 2–3 hours, to form a viscous spreadable plastic composition.

2. A process as defined in claim 1, in which the white dextrin is the partial degradation product of a member of the class consisting of corn, wheat, potato, tapioca and sago starches, the maximum solubility of which in water is 90% by weight.

3. A process as defined in claim 1, in which the polyvinyl alcohol used is a hydrolysis product of polyvinyl acetate, the degree of hydrolysis varying from 85% to 100% and the viscosity (4% aqueous solution) from 5 to 60 cps.

4. A self-supporting transparent water-soluble film composed essentially of white dextrin and a water-soluble polyvinyl alcohol, and containing a plasticizer selected from the class consisting of polyhydric alcohols and polyglycols, and containing also relatively small proportions of an emulsifying agent and of an alkali metal borate, the amount of dextrin ranging from ⅓ to 2 parts by weight for each part by weight of polyvinyl alcohol, and the emulsifying agent, the alkali metal borate and the plasticizer being present respectively in the percentages by weight of 1 to 5, 0.5 to 5, and 10 to 50, based on the total weight of dextrin and polyvinyl alcohol.

References Cited

UNITED STATES PATENTS

| | | | |
|---|---|---|---|
| 2,439,108 | 4/1948 | Staehle | 117—161 X |
| 2,760,942 | 8/1956 | Oakley | 260—17.4 |
| 2,850,468 | 9/1958 | Giggey | 260—17.4 |
| 3,034,999 | 5/1962 | Wilson | 260—17.4 |
| 3,044,974 | 7/1962 | Tanabe et al. | 260—17.4 |
| 3,133,890 | 5/1964 | Britton | 260—17.4 |
| 3,279,943 | 10/1966 | Skeen et al. | 117—138.8 |
| 3,316,190 | 4/1967 | Suzumura et al. | 260—17.4 |
| 3,324,057 | 6/1967 | Suzumura et al. | 260—17.4 |
| 3,329,509 | 7/1967 | Julius | 260—17.4 |

WILLIAM D. MARTIN, *Primary Examiner.*

J. E. MILLER, JR., *Assistant Examiner.*

U.S. Cl. X.R.

117—138.8, 161; 264—216